Dec. 27, 1955  J. HALLER  2,728,134
PROCESS OF MAKING PERFORATED COMPOSITE OIL WELL BEARINGS
Original Filed March 20, 1950

Inventor
John Haller
Barthel & Bugbee
Attorneys

United States Patent Office 2,728,134
Patented Dec. 27, 1955

2,728,134

PROCESS OF MAKING PERFORATED COMPOSITE OIL WELL BEARINGS

John Haller, Northville, Mich., assignor, by mesne assignments, to Allied Products Corporation, Detroit, Mich., a corporation of Michigan Original application March 20, 1950, Serial No. 150,660, now Patent No. 2,571,868, dated October 6, 1951. Divided and this application March 14, 1951, Serial No. 215,471

4 Claims. (Cl. 29—149.5)

This invention relates to bearings and, in particular, to powdered metal bearings.

The object of this invention is to provide a process of making a composite powdered metal oil well bearing of dissimilar powdered metal components such as a powdered iron outer sleeve bearing with a perforated powdered bronze inner sleeve bearing, wherein the oil holes in the powdered bronze inner sleeve or bearing sleeve are disposed in directions intermediate the tangential and radial directions through the wall of the sleeve in such a manner as to carry the oil in a roughly chordal path from the outer to the inner surface of the bearing.

This is a division of my co-pending application Serial No. 150,660 filed March 20, 1950, for Composite Powdered Metal Bearing, now U. S. Patent No. 2,571,868 of October 6, 1951.

Powdered metal oil well bearings of the types shown in my co-pending applications Serial No. 81,274 filed March 14, 1949, for Porous Bearing with Lubricant Reservoir Therein, now U. S. Patent No. 2,625,452 of January 13, 1953, and in the application of Leland C. Blood, Serial No. 82,243 filed March 18, 1949, for Porous Chambered Bearing and Process of Making the Same, now U. S. Patent No. 2,628,138 of February 10, 1953, and the application of Arthur L. Causley, Serial No. 87,975 filed April 16, 1949, for Fluid-Permeable Article and Process of Making the Same, now Patent No. 2,665,960 of January 12, 1954, have been expensive to manufacture if made of powdered bronze, because of the high cost of materials, although possessing superior load-carrying characteristics. Powdered iron oil well bearings, on the other hand, while less expensive to manufacture, due to the lower cost of materials, are inferior in load-carrying characteristics to powdered bronze bearings. The present invention provides a process of making a composite powdered metal bearing having the outer oil well bearing portion constituting the major portion of the bulk and weight of the bearing composed of relatively inexpensive powdered iron, and the inner or load carrying portion of the bearing consisting of a thin sleeve composed of powdered bronze swaged or otherwise immovably secured within the powdered iron oil well bearing portion. The wall of the bronze sleeve, which may optionally be of solid bronze rather than powdered bronze, is provided with oil holes to more readily convey the oil from the powdered iron oil well portion to the load-carrying surface. These oil holes may be radial, or in a modification, roughly chordal.

Figure 6:
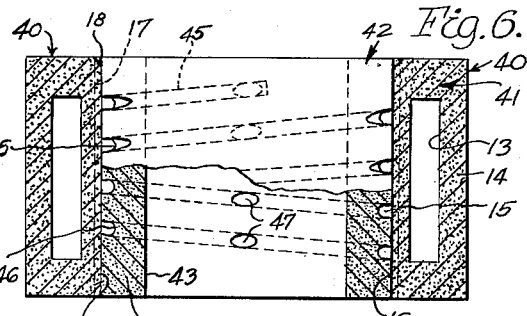
Figure 6 is a central vertical section through a composite powdered metal oil well bearing employing the finished powdered metal bearing sleeve produced in the molding operations of Figures 1 to 3 inclusive.

Referring to the drawings in detail, Figure 6 shows a composite powdered metal oil well bearing, generally designated 40, consisting generally of two portions, namely an outer powdered iron oil well sleeve 41 and a solid or powdered bronze inner bearing sleeve 42. The outer powdered iron oil well sleeve 41 consists of a hollow powdered iron cylinder having a preferably annular oil well 13 arranged between its outer and inner wall portions 14 and 15 respectively. The outer oil well sleeve 41 has a central bore 16 with circumferentially spaced recesses 17 and flared opposite ends 18.

Figure 1:
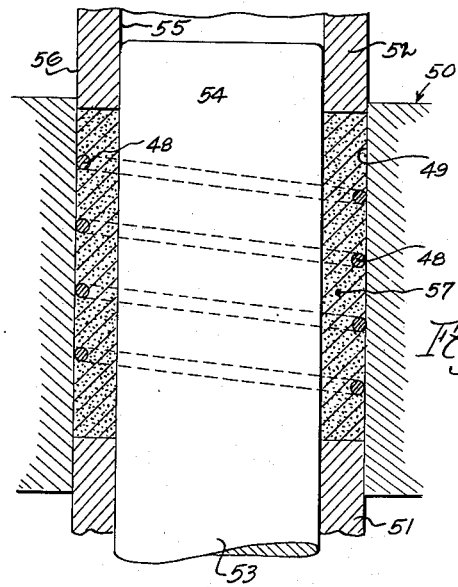
Figure 1 is a central vertical section through the die cavity of a powdered metal molding press at the start of molding the inner bearing sleeve used in the composite powdered metal bearing of Figure 6.

The outer oil well sleeve 41 is made according to the process disclosed and claimed in my co-pending application Serial No. 81,274 filed March 14, 1949, for Porous Bearing with Lubricant Reservoir Therein, now U. S. Patent No. 2,625,452 of January 13, 1953. Briefly stated, this consists of forming a core of infiltratable material having the shape desired for the oil well 13—for example, a ring of copper-zinc alloy composed of approximately 85% copper and 15% zinc—inserted in the mold cavity of a powdered metal molding press, such as that shown diagrammatically in Figures 1 to 3 herein, surrounded by powdered iron particles and pressed into a semi-finished bearing. This "green" powdered iron bearing containing the copper-zinc alloy insert is then placed in a sintering oven and sintered at a temperature of approximately 2020° F., whereupon the infiltratable metal of the core melts and enters into the pores of the powdered iron sleeve, strengthening the sleeve and leaving a void or oil well 13 in the space previously occupied by the core or insert. In the same molding operation, the recesses 17 and flared mouths 18 of the bore 16 are also produced by a suitably configured inner plunger in the molding press. The oil well 13 is then filled with oil by boiling it in an oil bath or by inserting it in a hot bath in an evacuated container.

Figure 3:
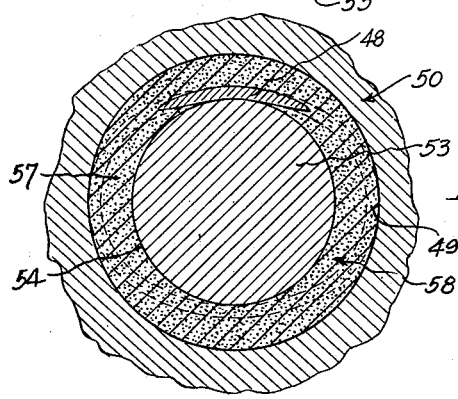
Figure 3 is a horizontal section taken along the line 3—3 in Figure 2.
Figure 5:
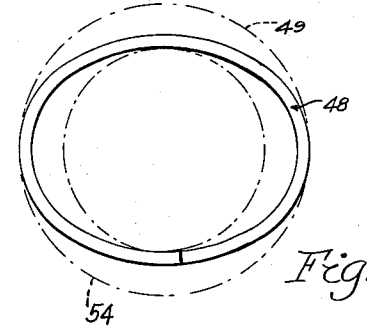
Figure 5 is a top plan view of the infiltratable core shown in Figure 4.
Figure 4:
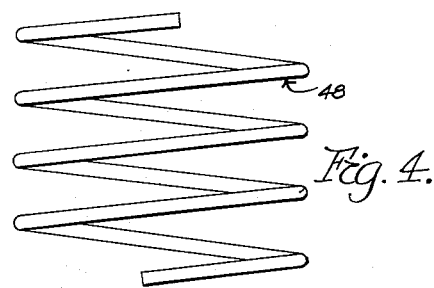
Figure 4 is a side elevation of the infiltratable core used in molding the powdered metal bearing sleeve shown in Figures 1 and 2.

The inner sleeve or bearing 42 is made of sintered powdered bronze and has inner and outer surfaces 43 and 44, the former constituting the bearing bore and the latter fitting into the bore 16, recesses 17 and flared ends 18 of the outer sleeve 41 in the manner described below. The bearing sleeve 42, however, is provided with elongated oil holes or passageways 45 (Figure 6) which have outer ports 46 communicating with the outer surface 44 and inner ports 47 communicating with the inner surface or bore 43. These passages or holes 45 are preferably neither radial nor tangential but intermediate the two, for example, approximately chordal, as shown in Figure 3. By analogy, the oil passages 45 might be compared with worm holes in a wooden sleeve because of their circuitous nature. It will be seen from Figure 3, however, that the oil passages 45 might be tangential rather than arcuate because in this manner they could directly interconnect the outer and inner surfaces 44 and 43 without proceeding radially. The circuitous oil passages 45, in addition, can hold a greater amount of oil than radial passages.

Figure 2:
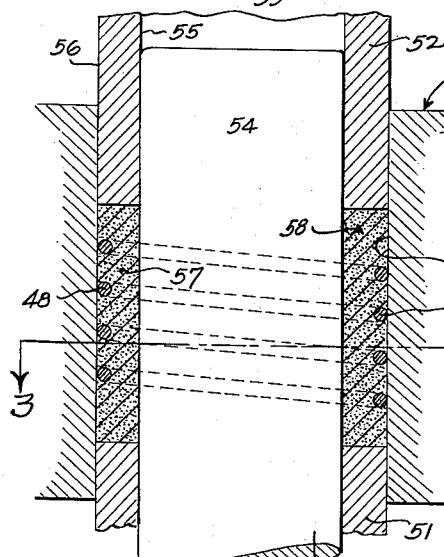
Figure 2 is a view similar to Figure 1, but showing the position of the parts at the conclusion of molding.

The circuitous oil passages 45 are produced in the powdered bronze sleeve 42 in the manner shown in Figures 1 to 5 inclusive. A core 48 of roughly helical form is first prepared, preferably of metallic lead, such as by winding the lead wire around a mandril. The spring-like body 48 thus obtained is withdrawn from the mandril and flattened into an oval (Figure 5) or otherwise having its convolutions distorted such as by distorting alternate convolutions in opposite directions. The thus distorted core 48 is then placed in the mold cavity 49 of a molding press die 50 having lower and upper tubular plungers 51 and 52 and a core rod or central lower plunger 53. The space around the core 48 is then packed with bronze powder, it being made sure that the convolutions of the core 48 touch both the mold cavity bore 49 and the outer surface 54 of the core rod 53. The upper plunger 52 is then brought downward into the mold cavity 59 with its bore 55 telescoping with the core rod 53 and with its outer surface 56 likewise telescoping with the die cavity bore 49. The compression of the powdered bronze particles or charge 57 forces the particles into smaller space as shown in Figure 2, thereby also causing the convolutions of the lead core 48 to be brought closer together. The upper plunger 52 is then retracted and the lower plunger 51 advanced upward, ejecting the semi-finished sleeve, generally designated 58.

The semi-finished or "green" powdered bronze sleeve 58 containing the lead core 48 is now placed in a conventional sintering oven and sintered at a temperature of approximately 1440° F. to 1500° F. for about 15 minutes. During the sintering process, the lead of the core 48 melts and infiltrates into the pores of the charge 87, leaving the circuitous oil passages 45 with their outer and inner ports 46 and 47 respectively (Figure 6), and thereby producing the bronze sleeve 42. This sleeve 42 is then inserted into the outer sleeve 40 and swaged to force it outward radially into position. In the swaging operation, the material of the sleeve 42 enters the recesses 17 and flared portions 18, as before, enlarging the inner bore 43 and reducing the diameters of the ports 47 and oil passages 45.

In the operation of the invention, the shaft or other rotary member journaled in the bearing bore 43 is fed with oil from the oil well 13 by oil seeping through the pores of the inner wall 15 of the outer sleeve 11 of powdered iron and passing through the holes 46 to the bore 43. Thus, even though the procedure closes up the pores of the inner bronze sleeve 12, oil still reaches the bearing bore 43 through the oil holes 19 and the shaft or other rotary member is properly lubricated for the life of the bearing by the oil contained in the oil well 13 without replenishment from any external source of oil.

Figure 7:
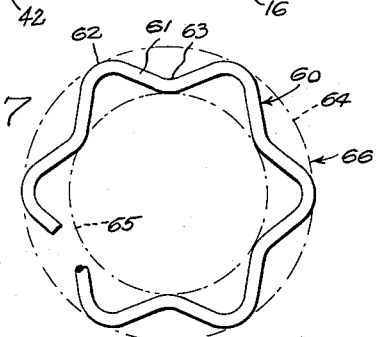
Figure 7 is a top plan view of a modified infiltratable core for the same purpose as that shown in Figures 4 and 5.

The modification shown in Figure 7 is a lead core, generally designated 60, with undulations 61 having crests 62 and troughs 63 respectively touching the outer and inner surfaces 64 and 65 of the finished sleeve, generally designated 66. The process and operation are substantially the same as described in connection with the form of the invention shown in Figures 1 to 5 inclusive and hence requires no repetition.

The word "porous" as used herein will be understood to refer only to pores or capillary passages which are sufficiently large to convey a lubricant, and not to microscopic passages which are so tiny as to be incapable of conveying a lubricant and therefore incapable of carrying out the objects or achieving the new results of the present invention as set forth above.

What I claim is:

1. A process of making a perforated powdered metal bearing bushing comprising forming a core from wire of a metal which is infiltratable into the powdered bushing metal and is of a lower melting temperature than said powdered bushing metal by bending said wire into an approximately helical shape, placing said core in an annular mold cavity, bending the convolutions of said core to extend repeatedly back and forth between and substantially touch the outer and inner side walls of said mold cavity and to substantially expose the crests of said convolutions at said side walls, placing a charge of powdered metal in said mold cavity around said core while leaving said crests of said convolutions substantially exposed, compressing said charge in said mold cavity, and sintering said compressed charge and core contained therein at a temperature sufficient to melt and infiltrate said core into said powdered metal charge while simultaneously forming therein a passageway having the shape and location previously possessed by said core and having openings extending from said passageway through the side walls of said charge at the previously-exposed locations of said core convolutions.

2. A process of making a perforated powdered metal bearing bushing comprising forming a core from wire of a metal which is infiltratable into the powdered bushing metal and is of a lower melting temperature than said powdered bushing metal by bending said wire into an approximately helical undulating shape, placing said core in an annular mold cavity with the convolutions of said core extending repeatedly back and forth between and substantially touching the outer and inner side walls of said mold cavity and with the crests of said convolutions substantially exposed at said side walls, placing a charge of powdered metal in said mold cavity around said core while leaving said crests of said convolutions substantially exposed, compressing said charge in said mold cavity, and sintering said compressed charge and core contained therein at a temperature sufficient to melt and infiltrate said core into said powdered metal charge while simultaneously forming therein a passageway having the shape and location previously possessed by said core and having openings extending from said passageway through the side walls of said charge at the previously-exposed locations of said core convolutions.

3. A process of making a composite oil well bearing, comprising forming an approximately helical core of infiltratable metal into a helix of approximately oval cross-section, placing said core in an annular mold cavity with the long diameter ends of the oval convolutions substantially touching the outer wall of said mold cavity and with the short diameter ends thereof substantially touching the inner wall of said mold cavity, placing a charge of powdered metal in said mold cavity around said core while leaving said ends of said convolutions substantially exposed at said side walls, compressing said charge in said mold cavity to form a sleeve, sintering said sleeve and core contained therein at a temperature sufficient to melt and infiltrate said core into said powdered metal charge while simultaneously forming therein a passageway having the shape and location previously possessed by said core and having openings extending from said passageway through the side walls of said charge at the previously-exposed locations of said core convolutions, preparing a hollow outer oil well body of porous material with a bore therein, inserting said sintered sleeve in said bore, and expanding said sleeve into locking engagement with said bore.

4. A process of making a composite oil well bearing, comprising forming an approximately helical core of infiltratable metal, placing said core in an annular mold cavity, bending the convolutions of said core to extend repeatedly back and forth between and substantially touch the outer and inner side walls of said mold cavity and to substantially expose the crests of said convolutions at said side walls, placing a charge of powdered metal in said mold cavity around said core while leaving said crests of said convolutions substantially exposed, compressing said charge in said mold cavity to form a sleeve, sintering said sleeve and core contained therein at a temperature sufficient to melt and infiltrate said core into said powdered metal charge while simultaneously forming therein a passageway having the shape and location previously possessed by said core and having openings extending from said passageway through the side walls of said charge at the previously-exposed locations of said core convolutions, preparing a hollow outer oil well body of porous material with a bore therein, inserting said sintered sleeve in said bore, and expanding said sleeve into locking engagement with said bore.

References Cited in the file of this patent

UNITED STATES PATENTS

| Number | Name | Date |
|---|---|---|
| 1,129,989 | Kelsey | Mar. 2, 1915 |
| 1,816,758 | Adams | July 28, 1931 |
| 1,986,850 | Pohl et al. | Jan. 8, 1935 |
| 2,145,460 | Ryder | Jan. 31, 1939 |
| 2,183,169 | Prentice | Dec. 12, 1939 |
| 2,187,307 | Friend | Jan. 16, 1940 |
| 2,195,749 | Lignian | Apr. 2, 1940 |
| 2,252,277 | Tate et al. | Aug. 12, 1941 |
| 2,273,589 | Olt | Feb. 17, 1942 |
| 2,277,107 | Imes | Mar. 24, 1942 |
| 2,299,228 | Gray | Oct. 20, 1942 |
| 2,357,614 | Stowell | Sept. 5, 1944 |
| 2,359,983 | Fry | Oct. 10, 1944 |
| 2,422,439 | Schwartzkopf | June 17, 1947 |
| 2,447,980 | Hensel | Aug. 24, 1948 |
| 2,455,804 | Ransley et al. | Dec. 7, 1948 |
| 2,464,517 | Kurtz | Mar. 15, 1949 |
| 2,571,868 | Haller | Oct. 16, 1951 |